United States Patent

[15] 3,684,917

Uno et al.

[45] Aug. 15, 1972

[54] PHOTO FLASH INTENSITY CONTROL WITH PREPARATORY FLASH CONTROLLING PARTIAL DISCHARGE OF MAIN CAPACITOR

[72] Inventors: Naoyuki Uno, Oi-machi, Iruma-gun; Seijiro Tokutomi, Fujisawa, both of Japan

[73] Assignee: Asahi Kogaku Kogyo Kabushiki Kaisha, Tokyo-to, Japan

[22] Filed: Sept. 10, 1970

[21] Appl. No.: 71,115

[30] Foreign Application Priority Data

Sept. 22, 1969 Japan.....................44/75482

[52] U.S. Cl...................315/151, 95/11.5, 250/205, 315/156, 315/159, 315/241 P
[51] Int. Cl............................................H05b 41/40
[58] Field of Search......315/151, 152, 154, 156, 159, 315/241 R, 241 P, 24 J; 95/10, 11.5 R; 250/205

[56] References Cited
UNITED STATES PATENTS
3,465,656  9/1969  Wick et al..............315/241 P FOREIGN PATENTS OR APPLICATIONS
450,150  4/1968  Switzerland.............95/11.5 R Primary Examiner—Roy Lake
Assistant Examiner—Siegfried H. Grimm
Attorney—Steinberg and Blake

[57] ABSTRACT

A system for automatically controlling flash illumination of a camera so as to achieve a proper exposure. The flash tube of the camera is energized from a capacitor which initially has a predetermined charge. Prior to energizing of the camera flash with this capacitor, a discharge circuit is connected to the capacitor for preliminarily discharging the capacitor to an extent determined by the photographing conditions. After this initial discharge, the charge remaining at the capacitor will also correspond to the photographing conditions, and it is this remaining charge which is then used for energizing the flash tube in connection with exposure of film in the camera.

6 Claims, 4 Drawing Figures

PATENTED AUG 15 1972

INVENTOR
NAOYUKI UNO
SEIJIRO TOKUTOMI
BY
Steinberg & Blake
ATTORNEY

PHOTO FLASH INTENSITY CONTROL WITH PREPARATORY FLASH CONTROLLING PARTIAL DISCHARGE OF MAIN CAPACITOR

BACKGROUND OF THE INVENTION

The present invention relates to cameras.

In particular, the present invention relates to artificial illumination for achieving proper exposures under conditions where natural illumination is inadequate for the purpose. Thus, the present invention relates to systems for achieving from flash illumination a proper film exposure.

There are two distinct basically different approaches to achieving the proper flash illumination. One old and well known approach resides in maintaining the extent of flash illumination substantially constant while adjusting the camera so as to adapt itself to this constant flash illumination in order to achieve a proper exposure. This system involves adjustment of the camera itself as by properly setting the size of the diaphragm aperture, utilizing in this connection such factors as the guide number of the flash structure, the distance between the camera and the object, and similar variables. The other approach is to control the amount of light which is provided by the flash apparatus, this control being brought about in accordance with the particular photographing conditions such as the distance between the camera and the object, the aperture at which the diaphragm is set, etc.

The present invention relates to this latter type of system where the flash apparatus itself is controlled. In order to achieve a control of this type it is customary to carry out different types of light-measuring operations. For example, according to one known system when the light discharged from the flash reaches a given value, the electrodes of the flash tube are short-circuited through a bypass circuit so as to terminate the artificial flash illumination. According to another system, prior to exposure of the film in synchronism with the flash illumination, there is a preparatory flash operation where an amount of artificial light is provided different from that which will actually be used during actual exposure but which is used for determining the controls which are required to achieve a proper exposure during the subsequent synchronized flash and film exposure. These types of systems have disadvantages. Thus, the system according to which the light from the flash is measured and terminated through a bypass is hampered by requiring complex and highly sensitive structure capable of responding extremely rapidly to the operation. While the second type of system does not require the high-speed light response of the first, nevertheless it also has certain disadvantages in connection with the complexity of the system which requires a large number of components, rendering the entire system undesirably cumbersome.

SUMMARY OF THE INVENTION

It is accordingly a primary object of the present invention to provide a flash control system which will avoid the above drawbacks.

In particular, it is an object of the invention to provide a flash control system which will utilize a preliminary preparatory flash for achieving the required controls, without requiring a large number of complex elements and without providing a highly cumbersome system.

It is particularly an object of the invention to provide a system of this type which lends itself to use with single lens reflex cameras where the light is internally measured after having passed through the lenses of the objective.

A more specific object of the present invention is to provide a system of this type which requires only simple switching elements of small output in order to achieve the objects of the invention.

It is in particular an object of the present invention to provide an arrangement according to which the operator need only depress the shutter-operating button to trip the shutter so as to initiate an exposure, and in response to this single operation all of the other operations will automatically take place to provide a proper exposure with flash illumination.

According to the invention a flash means is provided for creating flash illumination, and a main capacitor means is operatively connected with the flash means to provide energy for energizing this flash means during discharge of the main capacitor means. A trigger means is operatively connected to the flash means to trigger the initiation of the operation thereof when energizing the flash means with the main capacitor means. This main capacitor means is initially charged with a charge of a predetermined magnitude. A means is provided for diminishing this initial charge of predetermined magnitude by an amount determined by the photographing conditions prior to initiation of the operation of the flash means by the trigger means, so that when the flash means is energized by the main capacitor means, the energy delivered to the flash means from the main capacitor means is the energy which remains after the preliminary reduction in the charge of the main capacitor means according to the photographing conditions. Thus this remaining or residual energy of the main capacitor means also corresponds to the photographing conditions and provides through the flash means a flash illumination which will achieve a proper exposure.

The invention is illustrated by way of example in the accompanying drawings which form part of this application and in which.

DESCRIPTION OF PREFERRED EMBODIMENTS

Figure 1:
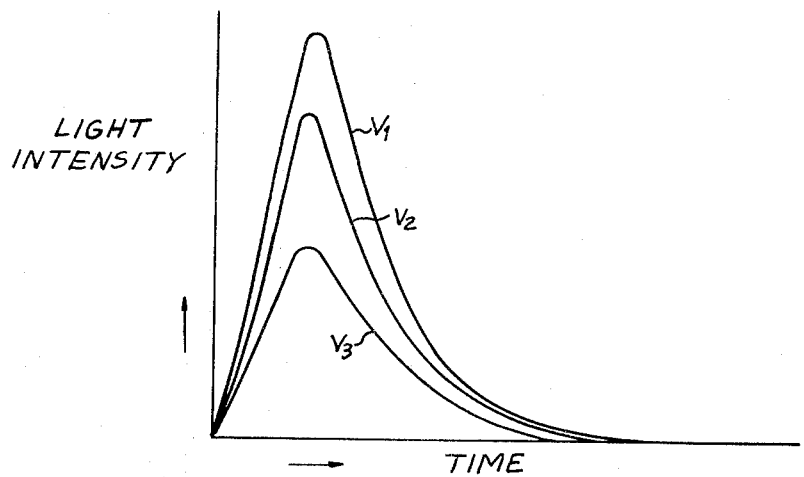
FIG. 1 is a graph illustrating the different types of operation which are achieved with different voltages applied to the flash discharge tube.

Referring now to the drawings, FIG. 1 illustrates different types of operation achieved from a typical flash discharge tube having different voltages applied across the discharge terminals thereof. In the graph of FIG. 1 the ordinate represents light intensity while the abscissa represents time. Thus, when a relatively high voltage $V_1$ is applied to the terminals, the flash tube will provide illumination of relatively high light intensity, while when a relatively low voltage $V_3$ is applied across the terminals a relatively low light intensity will be achieved. Of course for an intermediate voltage $V_2$ there will be an intermediate light intensity. Thus, by controlling the voltage which is applied across the terminals of the discharge tube it is possible to control the light intensity.

Figure 2:
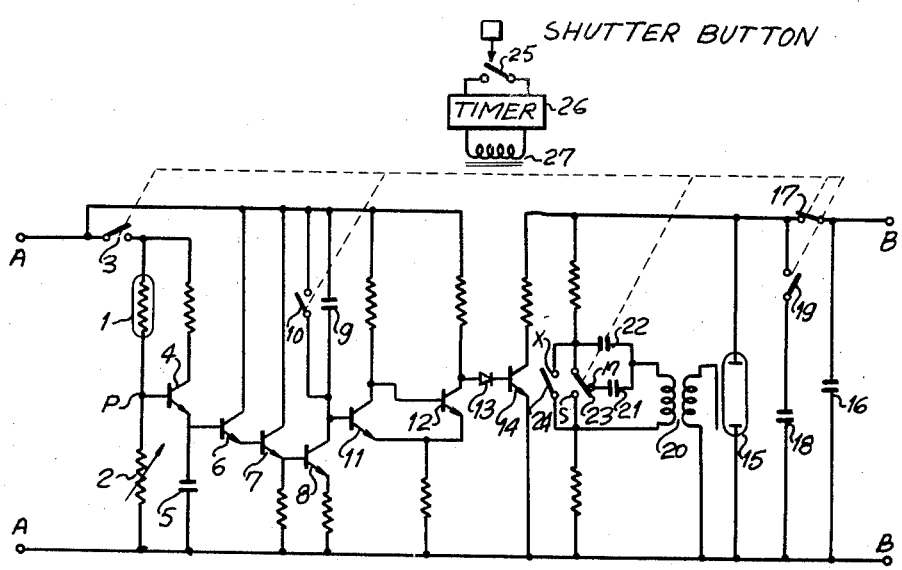
FIG. 2 is a schematic representation of one embodiment of a circuit of the invention.
Figure 3:
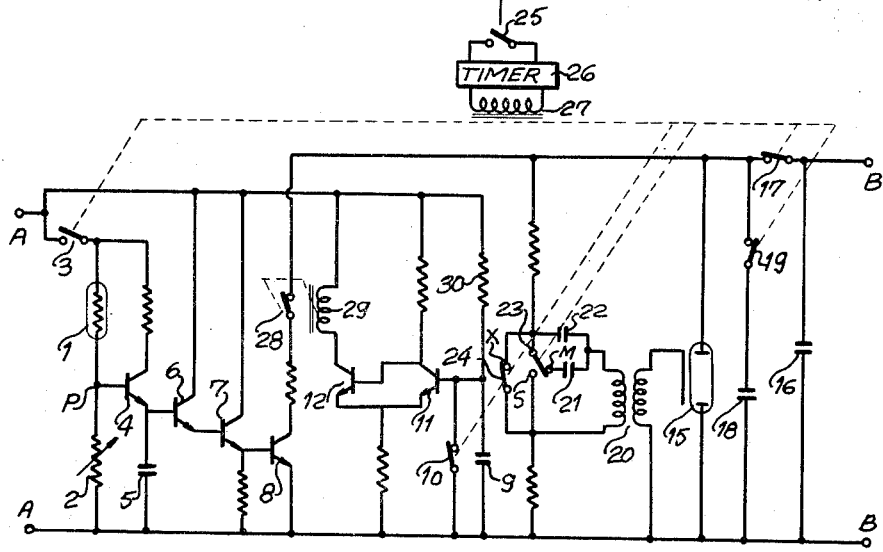
FIG. 3 is a schematic representation of a second embodiment of a circuit of the invention.
Figure 4:
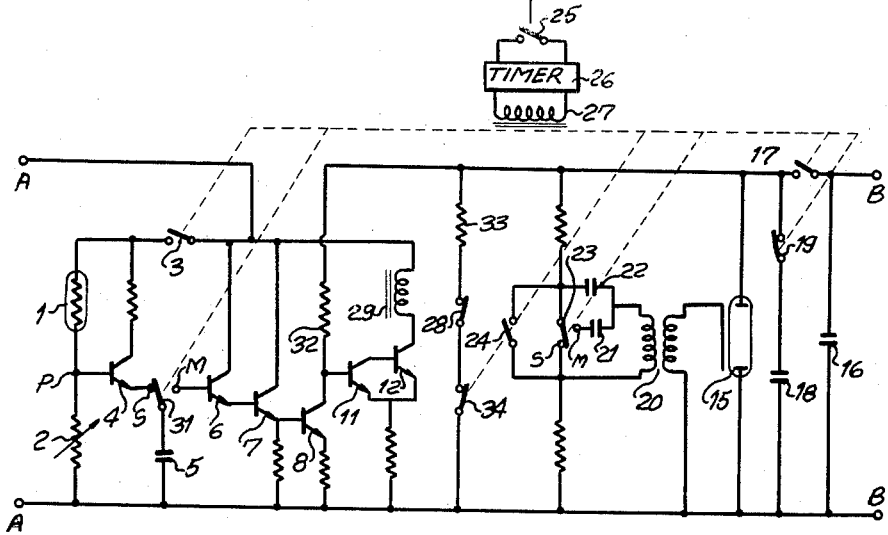
FIG. 4 is an illustration of a third embodiment of a circuit according to the present invention.

FIGS. 2–4 illustrate three different embodiments of circuits of the present invention for achieving controls of the type illustrated graphically in FIG. 1.

Referring to FIG. 2, the circuit includes a schematically represented photosensitive means 1 in the form of a photoconductor capable of receiving light so as to achieve a resistance the magnitude of which will depend upon the intensity of light impinging on the photosensitive means 1. This photoconductor 1 is connected in series with a variable resistor 2 which represents a variable resistor means adapted to be adjusted according to a plurality of exposure-determining factors. Thus according to the particular speed of the film which is exposed, the particular setting of the exposure time, and the size of the diaphragm aperture, the variable resistor means 2 will be set at a given value representing these exposure-determining factors. The series-connected photosensitive means 1 and variable resistor 2 are connected between terminals A of an unillustrated current source of relatively low voltage, and in this circuit there is a current-source switch 3 which when closed will render the photosensitive means 1 and the variable resistor means 2 operative.

Between the photosensitive means 1 and the variable resistor 2 there is a junction P to which the base of a current-amplifying transistor 4 is electrically connected. The emitter of the transistor 4 is electrically connected with an integrating capacitor 5 which will thus be charged according to the photographing conditions registered by the photosensitive means 1 and the variable resistor means 2. A high input impedance amplifying circuit 6, 7, in the form of transistors 6 and 7 is also interconnected with the current-amplifying transistor 4, the emitter of the latter being connected to the base of the transistor 6. Thus, the capacitor 5 together with the high-input impedance amplifying circuit 6, 7 forms a memory means for memorizing the information formed by the photographing conditions introduced through the photosensitive means 1 and the variable resistor means 2.

The output of the amplifying circuit 6, 7 is electrically connected with the base of a transistor 8. The collector of the transistor 8 is connected in series with a timing capacitor 9 forming a timing means for a purpose referred to below. This capacitor 9 together with the internal resistance of the transistor 8 forms a RC timing circuit. The timing capacitor 9 can be short-circuited by way of a switch 10 connected in parallel with the capacitor 9 so that closing of the switch 10 will bypass or short circuit the capacitor 9.

The transistors 11 and 12 form a transistorized Schmitt trigger circuit controlled according to the voltage across the terminals of the capacitor 9. The output of the Schmitt trigger circuit is connected through a diode 13 to the base of a switching transistor 14 which in turn controls a discharge circuit of the main capacitor means 16 which forms the main discharge capacitor from which energy is derived for the flash means formed by the flash discharge tube 15. Thus, the diode 13 and the transistor 14 form a switch means for the discharge circuit connected with the main capacitor means 16, as will be apparent from the description which follows.

In addition to the main capacitor 16 there is a preparatory flash capacitor means 18 connected in parallel with the capacitor means 16. In the circuit between these capacitors there is a switch 17, and between the preparatory flash capacitor 18 and flash means 15 there is an additional switch 19. These switches, as well as switch 10, form part of a relay switch means referred to in greater detail below. The switches 17 and 19 are interconnected in such a way that when one of these switches is open the other is necessarily closed.

A trigger means is provided for initiating the operation of the flash means 15 so that it will operate either through the discharge of the main capacitor means 16 or through the discharge of the preliminary or preparatory capacitor means 18. This trigger means includes a trigger transformer 20 having its secondary winding connected to an electrode of the flash means 15. The primary winding of the trigger transformer 20 is connected through a main trigger capacitor 21 with a contact M and this primary winding is also connected to a contact S. A change-over switch 23 also forms part of the relay switch means referred to below, and this switch 23 normally assumes a position engaging the contact M, but upon energizing of the relay 27 will engage the contact S. Through this contact S a preparatory trigger capacitor 22 is connected with the primary of the transformer 20. Thus, the flash means 15 will serve both to achieve a preparatory flash and the actual flash during exposure of film. When used for preparatory flash purposes the preparatory trigger capacitor 22 will act on the transformer 20 for triggering the flash means 15 so that the operation thereof will be initiated with the energy at this time being derived by discharge of the preparatory flash capacitor 18.

An additional contact X is provided in the circuit as illustrated in FIG. 2, and this contact X is adapted to be engaged by a switch 24 when the latter is closed. This switch 24 is the synchronizing switch of the camera. Thus the synchronizing switch 24 is closed in a well known manner in order to bring about flash illumination in synchronism with exposure of the film.

When the shutter button is depressed in order to trip the shutter to make an exposure, this shutter button being schematically represented in FIG. 2, it will serve in a known way to close a switch 25 which initiates the operation of a timer 26. This timer 26 will in turn initiate the energizing of the relay 27 through which the above switches of the relay switch means will be actuated in a manner described in greater detail below. The timer 26 is set to initiate the energizing of the relay 27 and to maintain the latter energized only for a given length of time. After this latter time has elapsed the relay 27 becomes automatically deenergized. This relay includes and operates the several switches 3, 10, 17, 19, and 23 referred to above, the relay-response times of these switches being slightly different so that they will operate in a given sequence upon energizing of the relay. This desired sequence is easily brought about by adjusting the gaps between the movable and stationary contacts of the several switches so that when a switch is closed, if it has a larger gap a slightly longer time will be required for closing of the switch than if it has a smaller gap. An unillustrated source of high voltage is connected into the circuit through the terminals B. As is well known, before a cycle of operations is started the several capacitors 16, 18, 21, and 22 will have been charged so that these capacitors initially have charges of predetermined magnitudes.

The embodiment of the invention which is illustrated in FIG. 3 differs from that of FIG. 2 in that the transistor 8, which has the internal resistance responding to the integrated information memorized by the capacitor 5 has its collector connected with a switch 28 rather than with the timing capacitor 9. Thus, the input of the transistor 8 in FIG. 3 will receive the same output as the input of the transistor 8 of FIG. 2. However the collector of the transistor 8 is in the embodiment of FIG. 3 connected to a relay switch 28 controlled by the relay coil 29, this switch 28 normally being open so that it becomes closed only when the relay 29 is energized. While in the embodiment of FIG. 2 the switching means for controlling the discharge circuit for preliminarily discharging the capacitor 16, in a manner described below, is formed by the diode 13 and switching transistor 14, in the embodiment of FIG. 3 this switching means is formed by the relay switch 28 which in this case controls the discharge circuit of the main capacitor means 16. With the embodiment of FIG. 3 there is connected between the low voltage current-source terminals AA a fixed resistor 30 which is connected in series with the timing means formed by the timing capacitor 9, and it will be noted that in this case also there is a short-circuiting or bypass switch 10 which is controlled by the relay 27 and which serves to short circuit the capacitor 9 when this switch 10 is closed. The capacitor 9 in this case also controls the transistorized Schmitt trigger circuit formed by the transistors 11 and 12.

In the embodiment of FIG. 4, the timing capacitor 9 and the switch 10 which coacts therewith have been eliminated. In this embodiment there is a switch 31 connected to the memory means 5. Thus the integrating capacitor 5 can be connected through the switch 31 either to the contact S or to the contact M. This switch 31 forms part of the relay switch means of the embodiment of FIG. 4 and normally assumes a position engaging the contact M. When the switch 31 engages the contact S of FIG. 4 the memory or integrating capacitor 5 is connected to the emitter of the current-amplifying transistor 4, while when the switch 31 engages the contact M, the memory means 5 is operatively connected with the transistorized amplifying circuit 6, 7 which serves to transmit the information to the transistor 8 the internal resistance of which assumes a value corresponding to the photographing conditions. It is apparent that these components of FIG. 4 as well as the corresponding components of FIGS. 2 and 3 form a conditioning means for conditioning the discharge circuit of the capacitor means 16 so that the latter will be discharged through this discharge circuit, in a manner described in greater detail below, according to the photographing conditions. In the embodiment of FIG. 4 the collector of the transistor 8 is provided with a collector resistor 32. The Schmitt trigger circuit 11, 12 of FIG. 4 is connected to the collector of the transistor 8 in this embodiment, and it will be noted that the same connection is provided in the embodiment of FIG. 2.

FIG. 4 also has the relay switch 28 which is normally open and which serves as the switching means for the discharge circuit of the capacitor 16, this switch 28 again being controlled from the relay coil 29 connected to the Schmitt-trigger 11, 12. Thus, in the case of FIG. 4 as well as in the embodiment of FIG. 3 the switch 28 is connected in series in the discharge circuit of the capacitor means 16. In the embodiment of FIG. 4 the discharge circuit includes an additional switch 34 which forms part of the relay switch means controlled through the relay coil 27.

The structure described above operates as follows:

As has been pointed out above in connection with FIG. 1, the light intensity provided by the flash tube will depend upon the magnitude of the voltage applied to the terminals thereof, and of course this voltage will be determined by the charge of the main discharge capacitor means 16 used to energize the flash means 15 during exposure of film. In a single lens reflex camera, there is a duration of approximately 30 ms from the instant of initiation of shutter release by depressing the shutter button, for example, and in fact a somewhat longer duration, until the X contact is engaged upon closing of the switch 24 so as to provide an exposure of the film which is synchronized with the flash illumination. With the above-described stricture a preparatory or preliminary flash is carried out during this time between initiation of shutter release and closure of the switch 24. The magnitude of the charge of the main capacitor means 16 available for operating the flash means 15 is controlled through information from light reflected from the object, as well as from other photographic conditions such as the setting of the diaphragm, etc., so that when a synchronized exposure is made the extent of flash illumination will provide a proper exposure.

As was indicated above the several capacitors 16, 18, 21 and 22 are all initially charged to a predetermined extent before the shutter button is depressed in order to initiate the exposure operations. Upon depressing of the shutter button, referring first to the embodiment of FIG. 2, the switch 25 closes in synchronism with the initiation of release of the shutter. The timer 26 will energize the relay 27 simultaneously with the closing of the switch 25. Energizing of the relay 27 will open the switch 17 while simultaneously closing the switch 19. Also, the energizing of the relay 27 results in simultaneous closing of the switches 3 and 10. Then, with a slight delay resulting from the adjustment of the gap between the movable and stationary switch contacts, the change-over switch 23 moves into engagement with the contact S, in response to energizing of the relay 27. Of course, the switch 24 still remains open. In this way the relay switch means formed by the relay 27 and the switches controlled thereby respond to closing of the switch 25 in order to initiate the cycle of operations.

The engagement of the contact S by the switch 23 causes the preparatory flash trigger capacitor 22 to become operative to discharge so as to act through the trigger transformer 20 of the trigger means, thus initiating the operation of the flash means 15. Thus, the high voltage output of the secondary winding of the trigger transformer 20 will cause the flash tube 15 to create the preliminary preparatory flash, with the charge of the capacitor 18 being used at this time to operate the flash means 15. Since the switch 17 is open while the switch 19 is closed, the main capacitor means 16 cannot operate at this time. The discharge from the capacitor 18 will provide a flash of a given light intensity to reflect from the object to the photosensitive means 1. Thus, the characteristics of the object to be photographed and the other photographing conditions introduced according to the setting of the variable resistor means 2 will cause a current of a given magnitude to flow to the base of the current-amplifying transistor 4. The amplified current will charge the integrating or memory capacitor 5. The extent to which the latter is charged corresponds not only to the light reflected from the object but also to the additional photographing conditions, including the condition of the natural light, and thus the voltage across the terminals of the capacitor 5 as a result of this charging thereof represents the photographing conditions and is the information which is utilized for the subsequent control of the flash during actual exposure of film. This information is transmitted to the transistor 8 which will automatically assume in this way an internal resistance, through the high-input impedance amplifying circuit 6,7, which is indicative of the photographing conditions. At this time the switch 10 remains closed, this switch being normally open and being closed when the relay 27 is energized, so that the timing operations brought about by the timing means formed by the timing capacitor 9 have not yet been carried out.

All of the above information-memorizing operations for introducing the photographing conditions into the system by the above structure which forms a conditioning means is completed immediately after elapse of 1-2 ms of the preparatory flash time duration resulting from depression of the shutter-tripping button. The timer 26 is set so that the supply of current to the relay 27 is terminated after a lapse of time which is sufficiently greater than this latter duration so as to assure completion of the operation of the conditioning means for conditioning the discharge circuit to preliminarily discharge the capacitor means 16 by a predetermined extent. Thus, the timer 26 may be set to terminate the energizing of the relay 27 after a time of 3-4 ms has elapsed. Thus, within this latter time period after the switch 25 has closed the relay 27 will no longer be energized, and therefore the switches 3 and 10 will automatically open, and the change-over switch 23 will move back to the contact M. At the same time the switch 17 closes and the switch 19 opens. As a result of the opening of the switch 10 the timing capacitor 9 will become charged according to the control derived from the internal resistance of the transistor 8 which corresponds to the photographing conditions. At this time, due to the control derived by way of the Schmitt trigger circuit formed by the transistors 11 and 12 a control current will flow through the diode 13 and the switching transistor 14, making the latter transistor conductive. Inasmuch as the switch 17 is closed at this time, the discharge circuit for the capacitor 16 which includes the switch 17 and the transistor 14 will bring about a discharge of the main capacitor means 16 under the control of the collector resistance of the transistor 14. After a lapse of time corresponding to the photographing conditions, as controlled by the timing capacitor 9, the Schmitt trigger circuit will automatically reverse itself rendering the transistor 12 non-conductive and thus cutting off the flow of current to the switching transistor 14. The result is that the discharge of the capacitor 16 is automatically terminated in this way in accordance with the photographing conditions.

Thus, the main discharge capacitor means 16 discharges during a time interval controlled by the capacitor 9 and thus in accordance with the photographing conditions which through the above conditioning means brings about a control of the time of discharge of the capacitor 16 through the capacitor 9. As a result a predetermined residual charge will remain at the capacitor means 16. Because the capacitor means 16 is initially charged with a charge of a predetermined magnitude, the remaining charge, after the controlled discharge due to the timing of the capacitor 9, will also be indicative of the photographing conditions. All of the above operations for controlled discharge of the capacitor means 16 are completed prior to closing of the switch 24. Thus, when the switch 24 closes by engaging the contact X, the main triggering capacitor 21 will operate to trigger, through the trigger transformer 20, the flash tube 15, so that the latter will now be discharged with the charge remaining at the capacitor means 16. As is apparent from the above discussion of FIG. 1, the extent of the light intensity of the flash will be determined according to the charge of the discharge capacitor, and thus the light intensity of the flash at this time will be determined in accordance with the photographing conditions so as to achieve a proper exposure.

In the embodiment of the invention which is illustrated in FIG. 3, the relay 27 is energized in precisely the same way and the several switches 3, 10, 17, 19, and 23 of the relay switch means are all operated in the manner described above. The photosensitive means 1 receives light reflected from the object as a result of the preparatory flash thus introducing the photographing condition corresponding to this factor into the memory or integrating capacitor 5 which also receives the additional information according to the photographing conditions, as pointed out above. This information is then transmitted to the transistor 8 so as to determine the internal resistance thereof, as pointed about above.

With the embodiment of FIG. 3, however, the normally open switch 28 remains open at this time due to the fact that the relay coil 29 is not yet energized. Thus, as was the case with FIG. 2, the conditioning means first operates to introduce the photographing conditions into the system before the discharge circuit of the main capacitor means 16 is closed to bring about a preliminary discharge in accordance with the photographing conditions. When the timer 26 terminates the operation of the relay 27, the switch 10 of FIG. 3 will open, so that now the timing provided by way of the capacitor 9 will come into operation to determine the duration of the discharge of the capacitor 16 through the discharge circuit. In this embodiment the timing circuit includes the resistor 30 as well as the capacitor 9. The Schmitt trigger circuit 11, 12 will thus operate during the duration determined by the capacitor 9 so as to energize the relay 29 and close the switch 28, thus closing the discharge circuit. Now the main capacitor means 16 will discharge to an extent determined by the internal resistance of the transistor 8, and thus corresponding to the photographing conditions. After a lapse of time determined by the fixed resistor 30 together with the action of the timing capacitor 9, the Schmitt trigger circuit 11, 12 automatically reverses itself so as to terminate the flow of current to the coil of the relay 29, thus causing the switch 28 to open, so that the preliminary discharge from the main capacitor means 16 is terminated.

Thus, in this case the discharge operation will continue for a fixed time. However since the extent of discharge is determined by the discharge circuit resistance during the discharge time, which is to say by the internal resistance of the transistor 8, the charge which remains at the main capacitor means 16 after the preliminary discharge thereof corresponds to the photographing conditions. Therefore, a proper exposure will then be obtained during synchronized flash upon closing of the switch 24.

In the embodiment of FIG. 4, the several relay switches 3, 17, 19 and 23 will again operate in a manner described above in response to energizing and deenergizing of the coil of the relay 27. However, in this case the relay switch means includes the switch 31 which upon energizing of the relay 27 will move to the contact S connected to the emitter of the current-amplifying transistor 4. Moreover, the switch 34 forms part of the relay switch means and this switch is displaced to an open position upon energizing of the relay 27. Since the switch 34 is open, the discharge circuit for the main capacitor 16 is necessarily maintained open at this time. Also the photographing conditions are transmitted to the capacitor 5 through the switch 31 at this time. Therefore the memory means 5 will operate to memorize the photographing conditions. Upon termination of flow of current to the relay 27 by the timer 26, the switches 3, 17, 19 and 23 return to their normal positions, as described above, and in addition the switch 31 will assume its normal position engaging the contact M. At the same time the switch 34 will assume its normally closed position. The switching over of the switch 31 to the contact M will transmit the memorized photographing conditions to the transistor 8 so as to set the set the internal resistance thereof again at a value corresponding to the photographing conditions. At this time the Schmitt trigger circuit 11, 12 will operate so that with the divided value of voltage across the terminals of the fully charged main capacitor means 16, as a result of the action of the transistor 8 as well as the fixed resistor 32, current is supplied to the relay 29, in the Schmitt trigger circuit, for energizing the relay and thus closing the switch 28. Therefore, with both the switches 28 and 34 closed, the discharge circuit which includes the resistor 33 will cause the initial charge on the capacitor 16 to drop. In this embodiment the voltage across the terminals of the main capacitor means 16 continues to drop until a certain point is reached where the Schmitt trigger circuit reverses itself, this circuit at this time receiving a voltage of a divided value of this dropping voltage, or in other words a fraction of the dropping voltage of the capacitor 16, as a result of the internal resistance of the transistor 8. At this latter point the Schmitt trigger circuit reverses so that flow of current to the relay 29 is terminated, thus opening the switch 28 and terminating the preliminary discharge of the capacitor 16.

Therefore, the discharge of the main capacitor means 16 is completed with this embodiment when the voltage across the terminals thereof reaches a value corresponding to the photographing conditions, as determined by the internal resistance of the transistor 8. When immediately thereafter the synchronized flash is brought about by closing of the switch 24, this flash takes place with the controlled remaining charge of the capacitor means 16 serving to generate an amount of light which will automatically provide a proper exposure for the film in a manner described above in connection with the other embodiments.

Thus, as has been pointed out above, in accordance with the present invention, the capacitor 16 which initially is charged with a charge of a predetermined magnitude is preliminarily discharged on the basis of the prevailing photographing conditions determined by the preparatory flash and the temporarily memorized exposure-determining factors, so that a proper light intensity for the synchronized flash is achieved with the charge which remains at the capacitor means 16. When this system of the invention is contrasted with a conventional control system according to which the operation of the flash is terminated, after a duration of approximately 1-2 ms, by way of a bypass discharge of the capacitor, the advantages of the arrangement of the present invention become apparent. These advantages are of considerable significance inasmuch as the bypass discharge of such a conventional system requires a transistor or a silicon-controlled element of large output to act as the essential bypass switching element. According to the present invention, however, it is sufficient to provide for discharge control within the time which elapses between depression of the shutter-operating button and the closing of the switch 24. As was pointed out above in a single lens reflex camera, this will involve a time duration of approximately somewhat more than 30 ms, for example, so that the entire controlled preliminary discharge of the main capacitor means can easily take place within a time duration of approximately 20 ms, thus assuring completion of the preliminary operations before the synchronizing switch 24 closes. Therefore, the arrangement of the present invention is of considerable practical value inasmuch as switching components of small output and high operating efficiency can be provided at relatively low cost to achieve the required operations with extremely reliable precision.

As has been pointed out above, it is preferred in accordance with the invention to carry out all of the preliminary operations, including the preparatory flash, in response to the single manual operation of depressing the shutter button to start the exposure operations. However, where an information memorizing system is provided, as disclosed above, it is not absolutely essential to include all of the operations in an automated system responding to depression of the shutter button.

With the present invention exceedingly advantageous results and an excellent operation are achieved when the system of the invention is built into a single lens reflex camera where the light measurement is carried out internally after the light has passed through the lenses of the objective. However, this system of the invention can of course be utilized with other types of cameras with equally advantageous results.

What is claimed is:

1. For use with a camera, flash means for creating flash illumination, main capacitor means operatively connected with said flash means for providing energy to energize said flash means during discharge of said main capacitor means, trigger means operatively connected to said flash means to trigger the initiation of the operation thereof for energizing of said flash means by said capacitor means, said main capacitor means initially having a charge of a predetermined magnitude, and means for diminishing said initial charge of predetermined magnitude by an amount determined by the photographing conditions prior to initiation of the operation of said flash means by said trigger means, so that when said flash means is energized by said main capacitor means, the energy delivered to said flash means from said main capacitor means is the energy remaining after preliminary reduction in the charge of said main capacitor means according to the photographing conditions, whereby the remaining energy of said main capacitor means also corresponds to the photographing conditions and provides through said flash means a flash illumination which will achieve a proper exposure, said means for reducing the charge of said main capacitor means prior to triggering of said flash means including a discharge circuit through which said main capacitor means is preliminarily discharged, a switching means for switching said main capacitor means in parallel with said discharge circuit and said flash means, and conditioning means for conditioning said discharge circuit according to the photographing conditions so that the extent to which said capacitor means discharges through said discharge circuit is determined by the photographing conditions, said switching means including a diode and a switching transistor, a transistorized Schmitt trigger circuit operatively connected with said diode, and timing means conditioned by said conditioning means and coacting with said Schmitt trigger circuit for terminating the operation of said discharge circuit when the initial charge of said main capacitor means has been reduced by an amount corresponding to the photographing conditions.

2. For use with a camera, flash means for creating flash illumination, main capacitor means operatively connected with said flash means for providing energy to energize said flash means during discharge of said main capacitor means, trigger means operatively connected to said flash means to trigger the initiation of the operation thereof for energizing of said flash means by said main capacitor means, said main capacitor means initially having a charge of a predetermined magnitude, and means for diminishing said initial charge of predetermined magnitude by an amount determined by the photographing conditions prior to initiation of the operation of said flash means by said trigger means, so that when said flash means is energized by said main capacitor means, the energy delivered to said flash means from said main capacitor means is the energy remaining after preliminary reduction in the charge of said main capacitor means according to the photographing conditions, whereby the remaining energy of said main capacitor means also corresponds to the photographing conditions and provides through said flash means a flash illumination which will achieve a proper exposure, said means for reducing the charge of said main capacitor means prior to triggering of said flash means including a discharge circuit through which said main capacitor means is preliminarily discharged, a switching means for switching said main capacitor means in parallel with said discharge circuit and said flash means, and conditioning means for conditioning said discharge circuit according to the photographing conditions so that the extent to which said capacitor means discharges through said discharge circuit is determined by the photographing conditions, said switching means including a relay having a normally open switch, a transistorized Schmitt trigger circuit operatively connected with said relay for energizing the latter only during discharge of said main capacitor means during diminishing of the initial charge thereof according to said photographing conditions, and timing means conditioned by said conditioning means and coacting with said Schmitt trigger circuit for automatically deenergizing said relay to open said switch of said switching means to terminate the discharge of said main capacitor means at a point corresponding to the photographing conditions.

3. For use with a camera, flash means for creating flash illumination, main capacitor means operatively connected with said flash means for providing energy to energize said flash means during discharge of said main capacitor means, trigger means operatively connected to said flash means to trigger the initiation of the operation thereof for energizing of said flash means by said main capacitor means, said main capacitor means initially having a charge of a predetermined magnitude, and means for diminishing said initial charge of predetermined magnitude by an amount determined by the photographing conditions prior to initiation of the operation of said flash means by said trigger means, so that when said flash means is energized by said main capacitor means, the energy delivered to said flash means from said main capacitor means is the energy remaining after preliminary reduction in the charge of said main capacitor means according to the photographing conditions, whereby the remaining energy of said main capacitor means also corresponds to the photographing conditions and provides through said flash means a flash illumination which will achieve a proper exposure, said means for reducing the charge of said main capacitor means prior to triggering of said flash means including a discharge circuit through which said main capacitor means is preliminarily discharged, a switching means for switching said main capacitor means in parallel with said discharge circuit and said flash means, and conditioning means for conditioning said discharge circuit according to the photographing conditions so that the extent to which said capacitor means discharges through said discharge circuit is determined by the photographing conditions, a means being provided for actuating said conditioning means to place said discharge circuit in a condition corresponding to the photographing conditions prior to the preliminary discharge of said main capacitor means through the discharge circuit.

4. The combination of claim 3 and wherein said means for actuating said conditioning means includes a shutter-operated timer set into operation for a given period when the shutter is stripped to make an exposure, relay switch means maintained energized by said timer for said period, said relay switch means being operatively connected with said conditioning means for actuating the latter to register the photographing conditions, said conditioning means including a memory means for memorizing the photographing conditions, and means responding to termination of the energizing of said relay switch means when the period of operation of said timer has expired for connecting said memory means with said discharge circuit for rendering the latter operative to discharge from said main capacitor means a charge corresponding to the photographing conditions prior to connection of said main capacitor means with said flash means.

5. The combination of claim 4 and wherein said means which responds to termination of the energizing of said relay switch means includes a timing capacitor operatively connected with said relay switch means to be rendered operative upon the energizing of said relay switch means and operatively connected with said memory means for controlling the discharge of said main capacitor means through said discharge circuit according to the photographing conditions.

6. The combination of claim 4 and wherein said means for rendering said discharge circuit operative to discharge said main capacitor means preliminarily according to the photographing conditions includes a switch of said relay switch means connecting said memory means to said conditioning means while said relay switch means is energized during operation of said timer and connecting said memory means to said discharge circuit when said relay switch means is deenergized upon termination of the operation of said timer.

* * * * *